United States Patent [19]

Isogai

[11] Patent Number: 4,923,357
[45] Date of Patent: May 8, 1990

[54] CONTAINER TRANSFER LIFT
[75] Inventor: Shunji Isogai, Hekinan, Japan
[73] Assignee: Sugiyasu Industries Co., Ltd., Takahama, Japan
[21] Appl. No.: 213,700
[22] Filed: Jun. 30, 1988
[30] Foreign Application Priority Data Mar. 20, 1988 [JP] Japan ................................. 63-36505

[51] Int. Cl.$^5$ ............................................ B65G 69/22
[52] U.S. Cl. ................................... 414/495; 182/141; 187/8.52; 187/18; 187/9 R; 414/400; 254/2 R; 14/71.3; 14/72.5
[58] Field of Search ............... 414/495, 476, 401, 584, 414/540; 187/8.41, 8.65, 8.71, 8.72, 8.77, 9 R, 8.52, 18; 14/71.3, 72.5, 69.5; 182/141, 148; 254/2 R, 2 C, 8 R, 8 B, 8 C, 10 R, 10 B, 10 C, 122

[56] References Cited

U.S. PATENT DOCUMENTS

| | | | |
|---|---|---|---|
| 2,079,992 | 5/1937 | Gonzalez | 187/8.52 X |
| 3,153,544 | 10/1954 | Jung et al. | 414/495 X |
| 3,220,698 | 11/1965 | Carden | 414/495 X |
| 3,341,042 | 9/1967 | Carder . | |
| 3,582,043 | 6/1971 | Tranchero | 254/2 R |
| 3,820,670 | 6/1974 | Pizzo et al. | 414/400 X |
| 3,871,477 | 3/1975 | Kuest | 182/141 X |
| 3,990,557 | 11/1976 | Carden | 187/8.52 X |
| 4,442,921 | 4/1984 | Sherman | 187/8.52 |

FOREIGN PATENT DOCUMENTS

| | | | |
|---|---|---|---|
| 961447 | 1/1975 | Canada | 414/401 |
| 909560 | 3/1954 | Fed. Rep. of Germany | 414/495 |
| 2545427 | 11/1954 | France | 414/495 |
| 814917 | 6/1959 | United Kingdom | 414/495 |
| 876241 | 8/1961 | United Kingdom | 414/495 |
| 901524 | 7/1962 | United Kingdom | 414/401 |

Primary Examiner—Frank E. Werner
Attorney, Agent, or Firm—Lahive & Cockfield

[57] ABSTRACT

A lift which can, for example, be used for lifting a container onto a truck, or for lowering it, includes a horizontal base equipped with wheels and capable of being raised above a floor and thereby supported on the wheels so that the lift as a whole may be moved, while the base can otherwise rest on the floor. A horizontal frame is mounted on the base and has a horizontally projecting portion, and a scissors jack is provided on the frame. A horizontal container-carrying table is supported vertically movably on the jack and has a horizontally projecting portion lying above the projecting portion of the frame. The table is provided along a pair of longitudinal edges with a pair of wheel guide grooves. The lift includes a mechanism associated with the base and the wheels for raising and lowering the base, and a mechanism connected between the jack and the table for opening and closing the jack to move the table vertically.

6 Claims, 6 Drawing Sheets

CONTAINER TRANSFER LIFT

BACKGROUND OF THE INVENTION

1. Field of the Invention

This invention relates to a container transfer lift which is used for lifting a container from a platform provided in front of a warehouse, or other building, onto a truck drawn up alongside it, or lowering the container from the truck.

The term "container" as herein used means a wheeled case or case-like structure in which a plurality of objects can be packaged together for transportation. It does not only mean a typical shipping case forming a single truck or rail-wagon load, but also covers other forms of structures, such as a bogie provided with an upstanding framework and a pallet provided with a wire net or fence defining its sidewall.

2. Description of the Prior Art

A platform which is often provided in front of a building, such as a warehouse, is higher than the ground level, but the bed of a truck, particularly a heavy one, is usually still higher. They do not form a plane surface when the truck is drawn up alongside the platform. Therefore, it has been usual to lay a plate in an inclined position between the platform and the bed of the truck for lifting a container from the platform onto the truck, or lowering it from the truck, along the inclined surface of the plate. Although this is a very simple method, the container which holds heavy objects is so heavy that the movement thereof up or down the inclined plate is a very hard work. This is particularly the case when the platform is narrow and no ample space is available between the truck and the building.

It has also been possible to use a power gate, crane, or other device provided on the truck. This method is, however, useful only when the truck is equipped with any such device.

SUMMARY OF THE INVENTION

It is, therefore, an object of this invention to provide a lift which can efficiently perform the work of lifting a container from a platform in front of a building onto a truck drawn up alongside it and lowering it from the truck, even if the platform may be so narrow that no large space is available between the truck and the building.

This object is attained by a lift which comprises a horizontal base equipped with a plurality of wheels and capable of being raised above a floor and thereby supported on the wheels so that the lift as a whole may be moved, while the base can otherwise rest on the floor; a horizontal frame mounted on the base and having a portion projecting horizontally therefrom; a scissors jack provided on the frame; a horizontal load carrying plate supported vertically movably on the jack and having a portion projecting horizontally therefrom and lying above the projecting portion of the frame, the plate being provided along a pair of longitudinal edges thereof with a pair of wheel guide grooves extending through its projecting portion, too; and a mechanism connected between the jack and the plate for opening and closing the jack to move the plate vertically.

The projecting portion of the frame is preferably provided with a pair of transversely spaced apart supporting legs which are vertically movable to cooperate with the base for supporting the lift in position.

The load carrying plate is preferably provided with a pair of load guide flaps which are vertically rotatable between their vertical and horizontal positions about a pair of transverse edges, respectively, of the plate.

Moreover, the load carrying plate is preferably provided with a pair of wheel stoppers each adapted for projecting into one of the grooves when the plate is raised.

When the lift is used for lifting a wheeled container from a platform in front of, say, a warehouse onto a truck drawn up alongside it, it is so positioned that the base may rest on the platform, while the projecting portion of the frame extends beyond the platform. The jack is opened completely to lower the load carrying plate to its lowermost position and the container is moved onto the plate. Then, the jack is closed until the plate is raised to the level of height at which the bed of the truck is situated, and the container is transferred onto the truck. The sequence of operation is reversed for lowering a container from the truck.

When the load carrying plate is in its lowermost position, its grooves are substantially flush with the floor from which the load is lifted, or on which it is lowered. No large force is, therefore, required for lifting or lowering the load. The lift has a portion which can be so positioned as to project beyond the platform, and can, therefore, handle the load easily, even if the platform may be very narrow. This is a particular useful features when the load is so large in height, as compared with the door opening of the warehouse, that it would not permit the use of the conventional method employing an inclined plate.

Other features and advantages of this invention will become apparent from the following description and the accompanying drawings.

DETAILED DESCRIPTION OF THE INVENTION

Figure 1:
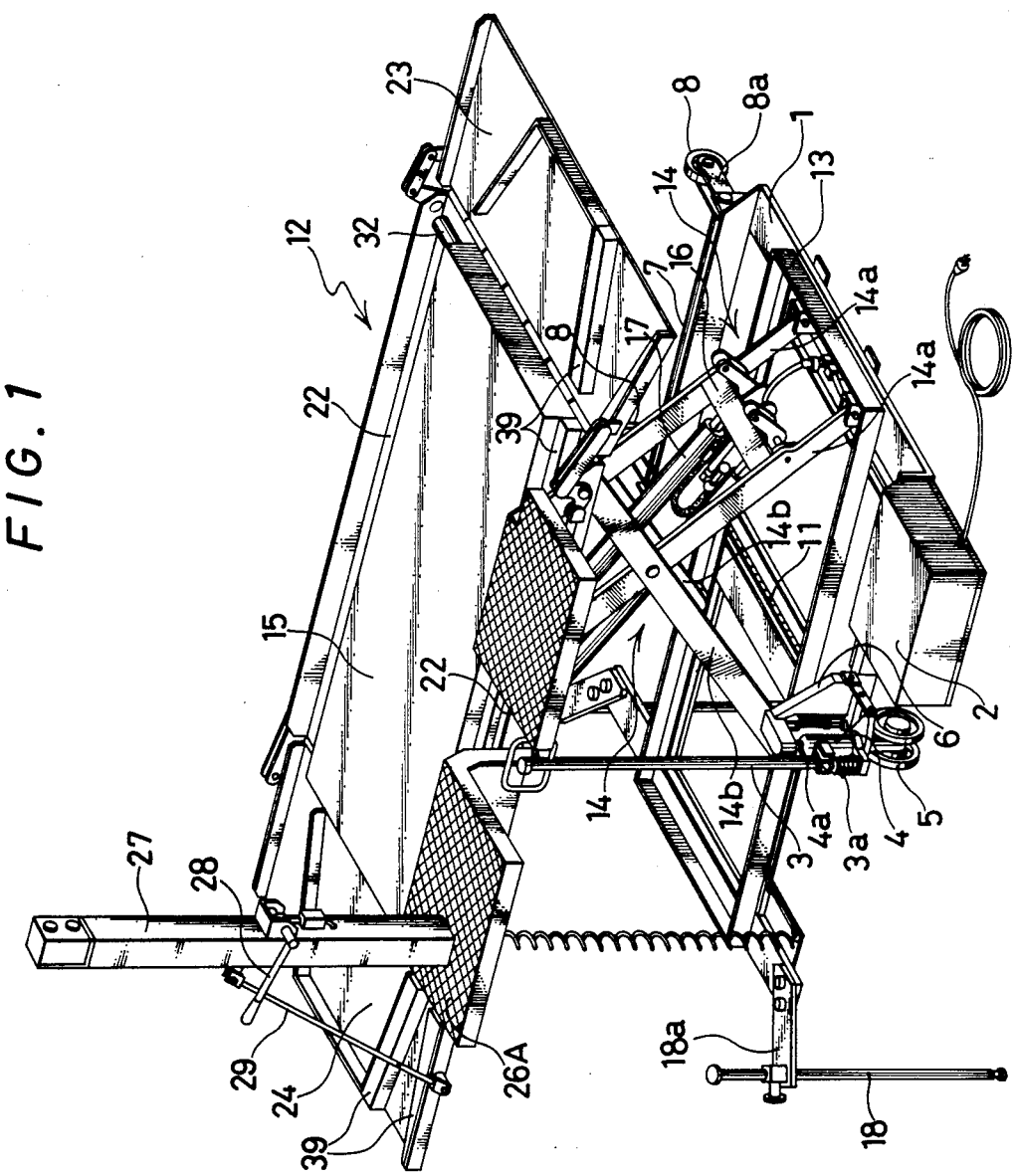
FIG. 1 is a perspective view of a lift embodying this invention.
Figure 2:
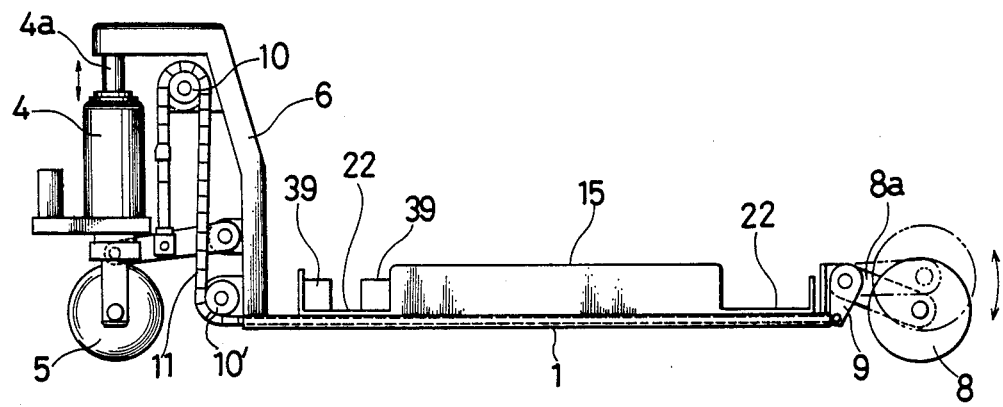
FIG. 2 is a side elevational view of a base and a mechanism associated therewith for raising it above the floor level.

A lift embodying this invention is shown by way of example in FIGS. 1 to 7. It includes a horizontal base 1 in the form of a rectangular frame and provided with a hydraulic unit 2 at one end thereof. The base 1 is also provided at one end thereof with a pumping handle bar 3, a pump 3a, a cylinder 4 and a pair of wheels 5 which are all rotatable horizontally together. The cylinder 4 includes a piston rod 4a connected to the base 1 by a connecting member 6. A horizontal shaft 7 is supported at the other end of the base 1 rotatably about its own axis. A pair of brackets 8a are secured to the opposite ends, respectively, of the shaft 7 and a wheel 8 is rotatably supported on each bracket 8a. An arm 9 is connected at one end to the shaft 7 at right angles thereto. A pair of vertically spaced apart sprockets 10 and 10' are supported on the connecting member 6. A chain 11 has one end fastened to a portion projecting from the connecting member 6 and extends vertically about the sprockets 10 and 10' and horizontally along the base 1. The other end of the chain 11 is connected to the other end of the arm 9.

If the handle bar 3 is rotated horizontally, i.e. about its own axis, the wheels 5 are turned in a different direction and the direction in which the base 1 and hence the lift as a whole are moved is easy to change. If the bar 3 is rotated vertically, the piston rod 4a is moved up to raise the connecting member 6 and one end of the base 1 is, therefore, raised above the floor on which it has been resting. At the same time, the arm 9 is pulled by the chain 11 and thereby causes the shaft 7 to rotate and thereby move down the wheels 8, whereupon the other end of the base 1 is also raised above the floor. The base 1 as a whole is now movably supported on the wheels 5 and 8. If the piston rod 4a is moved down, the base 1 is allowed to rest on the floor again.

A lifting unit 12 is mounted on the base 1. It includes a horizontal frame 13 supported on the base 1 and having a portion projecting horizontally therefrom. A scissors jack is supported substantially on that portion of the frame 13 which lies on the base 1. The jack comprises a pair of parallel X-shaped jack components 14. Each jack component 14 comprises a pair of links 14a and 14b which are pivotally connected to each other. The links 14a of the two jack components 14 are parallel to each other and each link 14a has a lower end supported rotatably on the frame 13 at one transverse end thereof. The links 14b are also parallel to each other and each link 14b has a lower end supported on the frame 13 slidably along one of its longitudinal edges. The upper ends of the links 14b are rotatably supported on a horizontal load carrying plate 15 at one end thereof, while the upper ends of the links 14a are supported on the plate 15 slidably along its longitudinal edges, respectively. Thus, the plate 15 is vertically movably supported on the jack. The links 14a are connected to each other by a connecting member 16. A hydraulic mechanism is connected between the connecting member 16 and the underside of the load carrying plate 15 for opening and closing the jack to lower and raise the plate 15. It comprises a pair of hydraulic cylinders 17 each having a base end supported rotatably on the connecting member 16, and including a piston rod having an outer end supported rotatably on the underside of the plate 15. The cylinders 17 are together by the hydraulic unit 2.

Figure 3:
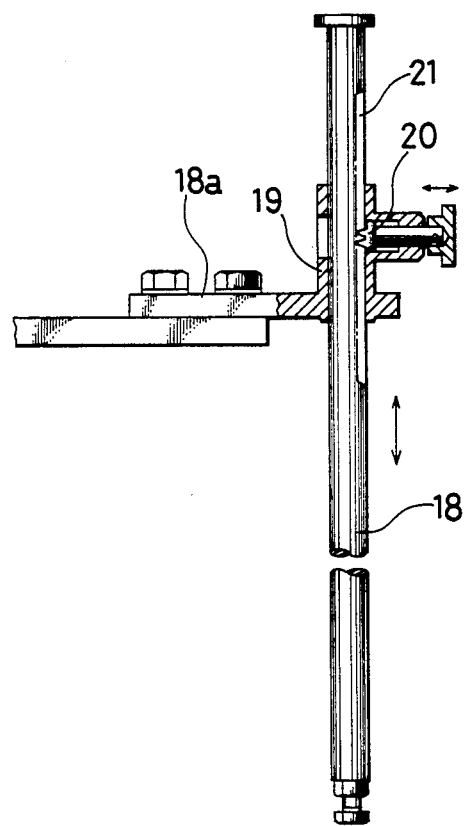
FIG. 3 is a side elevational view, partly in section, of a supporting leg and a mechanism associated therewith.

The frame 13 is rectangular in shape and its portion projecting from the base 1 is provided with a pair of arms 18a projecting from two corners, respectively, at the other end of the frame 13. A pair of supporting legs 18 are vertically slidably supported by the arms 18a, respectively. Each arm 18a includes a portion defining a leg holder 19 provided with a holding pin 20 and one of the legs 18 extends through the leg holder 19, as shown in FIG. 3. The leg 18 has a surface portion provided with a rack 21 with which the pin 20 is engageable to hold the leg 18 at a desired level of height.

The load carrying plate 15 is provided with a pair of wheel guide grooves 22 along its longitudinal edges, respectively. A pair of load guide flaps 23 and 24 are supported on two transverse edges, respectively, of the plate 15 rotatably between their vertical and horizontal positions. The load to be handled by the lift is moved on the flap 23 when it is received on the plate 15, and on the other flap 24 when it leaves the lift, or vice versa.

Figure 4:
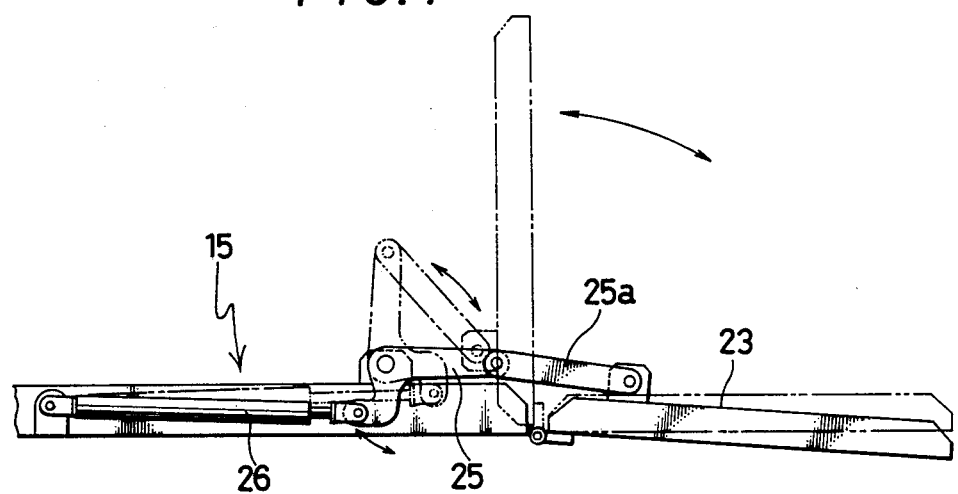
FIG. 4 is a side elevational view of a load guide flap and a mechanism associated therewith for rotating it.

The flap 23 is provided with a straight line 25a at each end of its base edge and a gas spring 26 is connected to the link 25a by an S-shaped link 25. The gas springs 26 are operable to move the links 25 and 25a and thereby rotate the flap 23 between its vertical and horizontal positions, as shown in FIG. 4.

Figure 5:
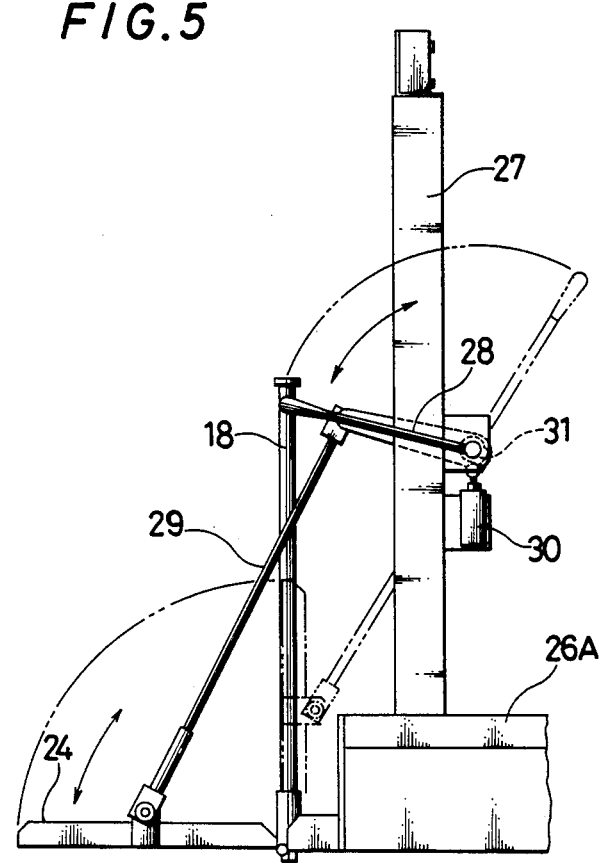
FIG. 5 is a side elevational view of another load guide flap and a mechanism associated therewith for rotating it.
Figure 6:
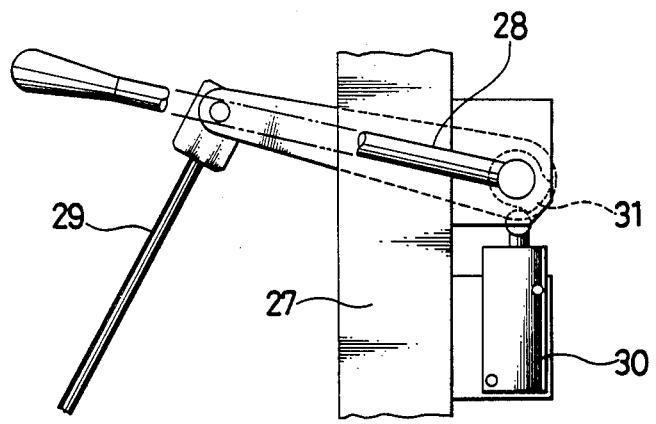
FIG. 6 is an enlarged view of a cam and a limit switch which are operationally associated with the flap shown in FIG. 5.

Two footplates for the lift operator to stand on are provided adjacent to one of the longitudinal edges of the load carrying plate 15. A post 27 is upstanding from the footplate 26A positioned adjacent to the flap 24. A lever 28 is vertically rotatably supported on a shaft provided on the post 27. The flap 24 is connected to the lever 28 by a connecting rod 29 having one end supported rotatably on the flap 24, while the other end thereof is rotatably supported on the lever 28, as shown in FIGS. 5 and 6. The lever 28 is rotatable to rotate the flap 24 between its vertical and horizontal positions. When the lever 28 is rotated to move the flap 24 to its vertical position, it can be rotated to a position in which it stays slightly beyond a line extending from the connecting rod 29, and thereby prevent the flap 24 from returning to its horizontal position inadvertently by its own weight. A cam 31 is provided on the shaft about which the lever 28 is rotatable. A limit switch 30 is supported on the post 27 below the cam 31. The cam 31 actuates the limit switch 30 when the flap 24 is in its horizontal position. A circuit not shown is provided for stopping the movement of the lifting unit 12 when the limit switch 30 has been actuated.

Figure 7:
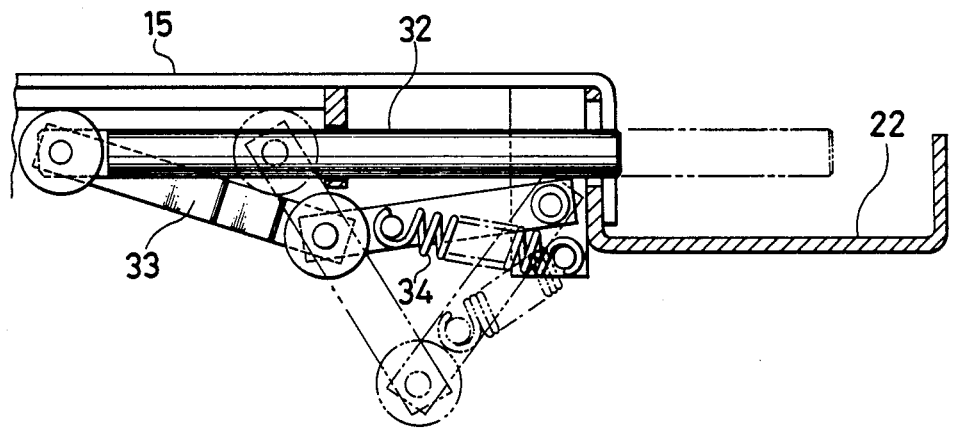
FIG. 7 is a side elevational view of a stopper and a mechanism associated therewith for causing it to project into a wheel guide groove.

The load carrying plate 15 is provided adjacent to the flap 23 with a pair of wheel stoppers which project into the wheel guide grooves 22, respectively, to abut on the wheels of a container on the plate 15 and thereby hold the container against movement off the plate 15 when the plate 15 is raised. Each stopper comprises a horizontal rod 32, a pair of links 33 pivoted to each other and forming a link assembly which is deformable between its V-shaped closed position and its substantially straight open position, and which has one end connected rotatably to one end of the rod 32, while the other end thereof is rotatably connected to the load carrying plate 15 adjacent to the other end of the rod 32, and a coil spring 34 connected between the link assembly and the plate 15, as shown in FIG. 7. The link assembly 33 stays in its open position to maintain the rod 32 in its retracted position as long as the plate 15 stays in its lowermost position. If the plate 15 is raised, however, the spring 34 contracts to pull the link assembly 33 into its V-shaped closed position and thereby allow the rod 32 to project into the groove 22, as an open space is made below the link assembly 33 to allow it to deform itself into its V-shaped position.

Figure 8A:
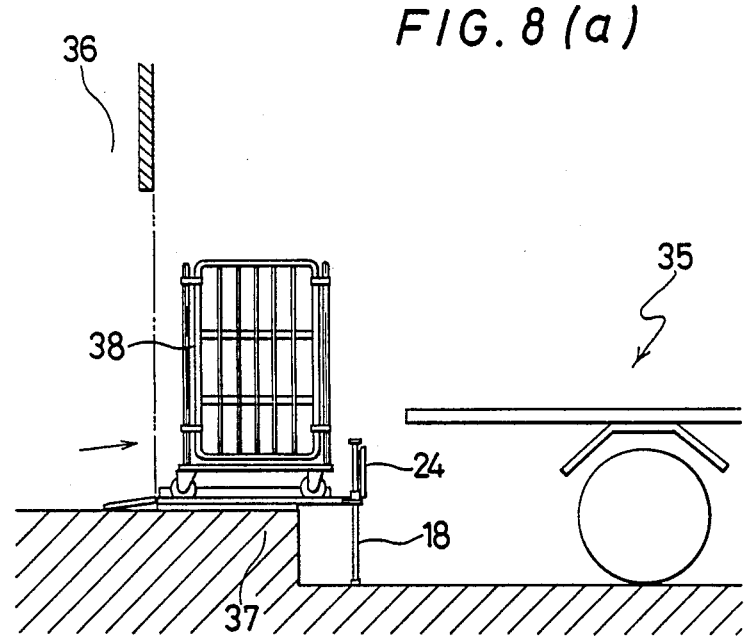
FIGS. 8(a) to 8(c) schematically illustrate the sequence of operation which takes place when the lift is used for lifting a container from a platform onto a truck.
Figure 8B:
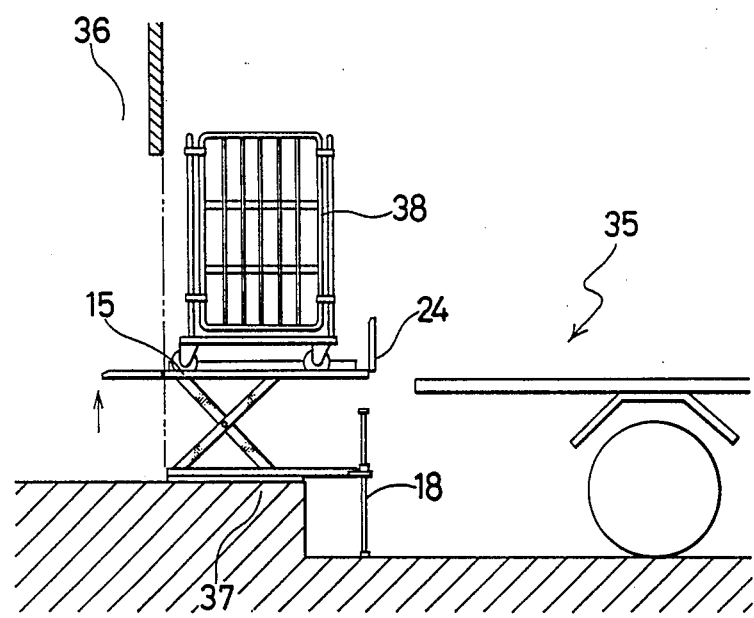
Figure 8:
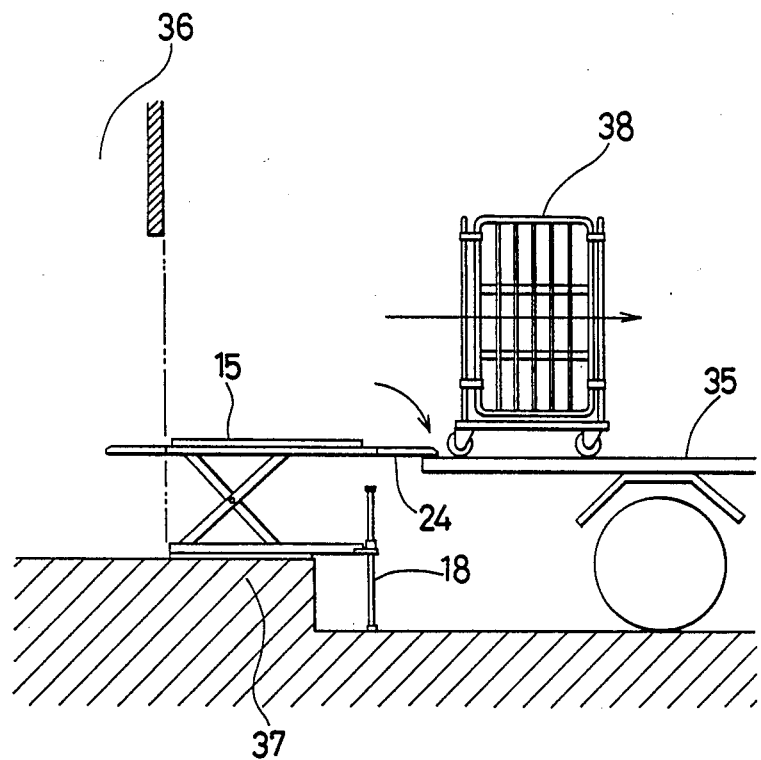

Attention is now directed to FIGS. 8(a) to 8(c) showing by way of example how the lift as hereinabove described is used. The handle bar 3 is tilted to raise the base 1 above the floor of, say, a warehouse 36 and the lift is moved to a platform 37 in front of the warehouse 36, while the wheels 5 are steered by the handle bar 3.

A truck 35 is drawn up alongside the platform 37. The lift is so positioned on the platform 37 that its projecting portion may extend beyond the edge of the platform 37 and over the ground on which the truck 35 is located. The base 1 is lowered to rest on the platform 37. The movement of the lift is easy to control, as the base 1 is supported at three points, i.e. the wheels 5 which are located adjacent to each other, and the wheels 8 which are spaced apart from each other. Then, the supporting legs 18 are lowered until their lower ends rest on the ground, as shown in FIG. 8(a), if required to ensure the stability of the lift resting on the platform 37. The flap 23 is lowered to its horizontal position.

Then, a fully loaded roll box pallet 38 is, for example, brought from the inside of the warehouse 36 and moved onto the lift, as shown in FIG. 8(a). The pallet 38 is easy to place in position on the lift, as the wheels of the pallet 38 are guided along the wheel guide grooves 22. Guide members 39 are provided on the flap 23 and in the grooves 22 to ensure that the wheels of the pallet be properly directed and guided into the grooves 22 (FIG. 1). Then, the load carrying plate 15 is raised to a level of height slightly above the bed of the truck 35, as shown in FIG. 8(b). The flap 24 is lowered to its horizontal position and the plate 15 is slowly lowered. If the flap 24 is lowered until it rests on the bed of the truck 35, the limit switch functions to stop the movement of the plate 15. The pallet 38 is transferred from the lift onto the truck 35, as shown in FIG. 8(c). The flap 24 is also provided with guide members 39 (FIG. 1) which ensure the smooth transfer of the pallet 38 with the aid of only a small pushing or pulling force applied thereto.

Although the lift has been described as being manually movable, it may be more useful to provide it with a device allowing it to move automatically. Although the lift has been described as being used for handling a wheeled container, it can also be employed a hand pallet, or other type of container having no wheel. In this particular case, the wheel guide grooves can be omitted.

What is claimed is:

1. Container transfer lift apparatus for transferring a load from a platform raised above a floor level, said apparatus comprising
    horizontal base means having a projecting horizontal portion,
    a plurality of wheels mounted on said base means, said wheels being selectively moveable between a raised position in which said base means can be moved on said wheels and a rest position in which said base means can rest on the platform,
    a plurality of supporting legs adjustably mounted on the projecting horizontal portion of said base means, said legs being arranged for adjustable vertical extension to the floor level for supporting said lift apparatus when the base means rest on the platform,
    a vertically extensible scissors jack mounted on said base means and having extensible means therefor,
    a horizontal carrying plate having opposed ends and mounted on said scissors jack, said carrying plate having a portion above said base projecting portion for substantially spanning said base means and said projecting portion thereof, and
    first and second load guide flaps mounted on said carrying plate at opposed ends thereof and each rotatable between a vertical position and a horizontal position in which said flap extends horizontally beyond said base means and beyond said projecting portion of said base means.

2. Container transfer lift apparatus according to claim 1, further comprising wheel guide grooves extending along said horizontal carrying plate between said opposed ends thereof.

3. Container transfer lift apparatus according to claim 2 further comprising wheel stopper means mounted with said carrying plate and arranged for projecting into said wheel guide grooves for engaging the wheels of a container placed therein and further arranged for retracting from said wheel guide grooves.

4. Container transfer lift apparatus according to claim 3 further comprising
    spring-loaded means for maintaining said wheel stopper means normally in said projecting position and selectively operable for retracting said wheel stopper means from said wheel guide grooves.

5. Container transfer lift apparatus according to claim 1 in which said base means includes a horizontally extending frame forming said projecting horizontal portion of said base means, said frame means mounting said supporting legs disposed substantially below said projecting portion of said carrying plate.

6. Apparatus for transferring a container between a platform raised from a floor level and a bed of a truck, said apparatus comprising
    a horizontal base provide with a plurality of wheels,
    means for engaging said wheels with the platform to raise said base above the platform for moving the apparatus on the platform and means for disengaging said wheels from the platform to rest said base on the platform,
    a horizontal frame mounted on said base and having a portion projecting horizontally therefrom,
    a vertically-extensible scissors jack mounted with said frame and having extensible means therefor,
    a horizontal table mounted on said jack, said table being arranged for supporting the container to be transferred, said table having a pair of opposed longitudinal edges and a pair of opposed transverse edges, said table being provided along said longitudinal edges with a pair of wheel guide grooves,
    a pair of transversely spaced apart legs mounted with the projecting portion of the frame for supportingly resting on the ground level, said legs being capable of vertical adjustment for accommodating the legs to a height of the platform,
    a first guide flap arranged adjacent one said transverse edge of the table for loading the container onto the table, said flap being rotatable between a vertical position and a horizontal position,
    a second guide flap arranged adjacent the other transverse edge of the table for unloading the container from the table, said flap being rotatable between a vertical position and a horizontal position,
    a pair of wheel-stoppers mounted with said table in proximity to one guide flap, and
    means for keeping the stoppers in a first position in which the stoppers do not block the wheel guide grooves when the table is in a lowest position, and alternatively for projecting the stoppers into the wheel guide grooves to engage wheels of the container for holding the container in position on the table.

* * * * *

UNITED STATES PATENT AND TRADEMARK OFFICE
CERTIFICATE OF CORRECTION

PATENT NO. : 4,923,357

DATED : 8 May 1990

INVENTOR(S) : Shunji Isogai

It is certified that error appears in the above-identified patent and that said Letters Patent is hereby corrected as shown below:

Column 3, line 58, after "are", insert --operable--.

Signed and Sealed this

Thirtieth Day of June, 1992

Attest:

DOUGLAS B. COMER

*Attesting Officer*   Acting Commissioner of Patents and Trademarks